US011330352B2

(12) United States Patent
 Athan

(10) Patent No.: US 11,330,352 B2
(45) Date of Patent: May 10, 2022

(54) AUDIO MICROPHONE STAND

(71) Applicant: Bryan Richard Athan, Altamonte Springs, FL (US)

(72) Inventor: Bryan Richard Athan, Altamonte Springs, FL (US)

(*) Notice: Subject to any disclaimer, the term of this patent is extended or adjusted under 35 U.S.C. 154(b) by 165 days.

(21) Appl. No.: 16/919,496

(22) Filed: Jul. 2, 2020

(65) Prior Publication Data

US 2021/0006882 A1 Jan. 7, 2021

Related U.S. Application Data

(60) Provisional application No. 62/870,041, filed on Jul. 2, 2019.

(51) Int. Cl.
| | |
|---|---|
| *H04R 1/08* | (2006.01) |
| *F16M 11/38* | (2006.01) |
| *F16M 11/20* | (2006.01) |
| *H02S 10/40* | (2014.01) |
| *H02S 20/32* | (2014.01) |
| *H02S 40/34* | (2014.01) |
| *H02S 40/38* | (2014.01) |
| *B60L 55/00* | (2019.01) |
| *G05D 1/00* | (2006.01) |
| *G05D 3/10* | (2006.01) |
| *B62D 55/06* | (2006.01) |
| *B62D 63/02* | (2006.01) |

(52) U.S. Cl.
CPC .............. *H04R 1/08* (2013.01); *B60L 55/00* (2019.02); *F16M 11/2021* (2013.01); *F16M 11/38* (2013.01); *G05D 1/0094* (2013.01); *G05D 3/105* (2013.01); *H02S 10/40* (2014.12); *H02S 20/32* (2014.12); *H02S 40/34* (2014.12); *H02S 40/38* (2014.12); *B62D 55/06* (2013.01); *B62D 63/02* (2013.01); *F16M 2200/06* (2013.01); *F16M 2200/08* (2013.01)

(58) Field of Classification Search
USPC ......... 248/158, 161, 162.1, 404, 406.2, 157, 248/419, 188.1, 188.5, 188.6
See application file for complete search history.

(56) References Cited

U.S. PATENT DOCUMENTS

| | | | | |
|---|---|---|---|---|
| 4,178,624 A | * | 12/1979 | Wilson ................ | H02B 1/36 361/614 |
| 4,691,886 A | * | 9/1987 | Wendling ............ | F16M 11/10 248/920 |
| 4,729,533 A | * | 3/1988 | Hillary ................ | F16M 11/10 106/6 |

(Continued)

*Primary Examiner* — Alfred J Wujciak
(74) *Attorney, Agent, or Firm* — Steven C. Stewart

(57) ABSTRACT

A device for holding an audio microphone is disclosed. The microphone holding device includes a base section having a base plate connected to a riser block that engages with a tube of a microphone holding section to enable rotation of the microphone holding section from a horizontal orientation to a vertical orientation. The device also includes an expander shaft section including an expander shaft coupled at one end with the tube and at another end with base plate. The expander shaft expands from a compressed shaft to an expanded shaft when the microphone holding section rotates from the horizontal orientation to the vertical orientation to assist in holding the microphone holding section in the vertical orientation.

17 Claims, 4 Drawing Sheets

(56) References Cited

U.S. PATENT DOCUMENTS

| | | | | |
|---|---|---|---|---|
| 4,844,387 A | * | 7/1989 | Sorgi | F16M 13/00 |
| | | | | 108/5 |
| 2015/0342562 A1 | * | 12/2015 | Messina | F16M 11/2014 |
| | | | | 248/124.1 |
| 2021/0307187 A1 | * | 9/2021 | Pan | F16M 11/26 |

* cited by examiner

AUDIO MICROPHONE STAND

PRIOR APPLICATION

This application claims the benefit of U.S. provisional patent application No. 62/870,041 filed on Jul. 2, 2019, the contents of which are hereby incorporated by reference.

TECHNICAL FIELD

These claimed embodiments relate to a device for holding an audio microphone.

BACKGROUND OF THE INVENTION

An audio microphone stand is disclosed. Microphone stands are typically used for holding a microphone and perhaps a display device during a live performance of a musician. One type of audio microphone stand has a base supporting section connected to boom section that holds the microphone. These particular stands without being tacked to a stage can fall over or become unstable when a heavy microphone is used with the stand. Further these boom type microphone stands do not easily fold up and remain folded in a portable configuration. Finally these stands are separate from a pedal board that is used to control the output from a guitar or other musical instrument. These additional devices reduce the stage space to a musician when performing.

SUMMARY OF THE INVENTION

The present invention relates to a device for holding a microphone. In one embodiment, the device for holding a microphone includes a microphone holding section includes a tube. The device includes a base section having a base plate connected to a riser block to engage with the tube of the microphone holding section to enable rotation the microphone holding section from a horizontal orientation to a vertical orientation. The device also includes an expander shaft section including an expander shaft coupled at one end with a mounting block attached to the tube and at another end with the base plate. The expander shaft expands from a compressed shaft position to an expanded shaft position when the microphone holding section rotates from the horizontal orientation to the vertical orientation to assist in holding the microphone holding section in the vertical orientation.

In another embodiment, a method for holding a microphone is described. The method includes providing a microphone holding section including a tube. A base section having a base plate is connected to a riser block. The riser block engages with the tube of the microphone holding section using a screw extending through apertures in the tube and the riser block. The microphone holding section is pivoted about the screw from a horizontal orientation to a vertical orientation. A mounting block is attached to the tube. One end of an expander shaft is coupled to the mounting block and another end of the expander shaft is coupled to the base plate. The expander shaft may be expanded from a compressed shaft position with the mounting block disposed on the tube adjacent the riser block to an expanded shaft position while changing an orientation of the tube from a horizontal orientation to a vertical orientation to assist in holding the microphone holding section in the vertical orientation.

In a further embodiment, a device for holding a microphone is described. The device includes a microphone holding section and a base section connected to a riser block. The riser block includes a means for engaging with the microphone holding section and for enabling rotation of the microphone holding section about a horizontal axis extending through the riser block. The device also includes an expander shaft section coupled at one end with a mounting block attached to the microphone holding section and at another end with the base section. The expander shaft section includes a means for expanding from a compressed position to an expanded position as the microphone holding section rotates about the axis.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
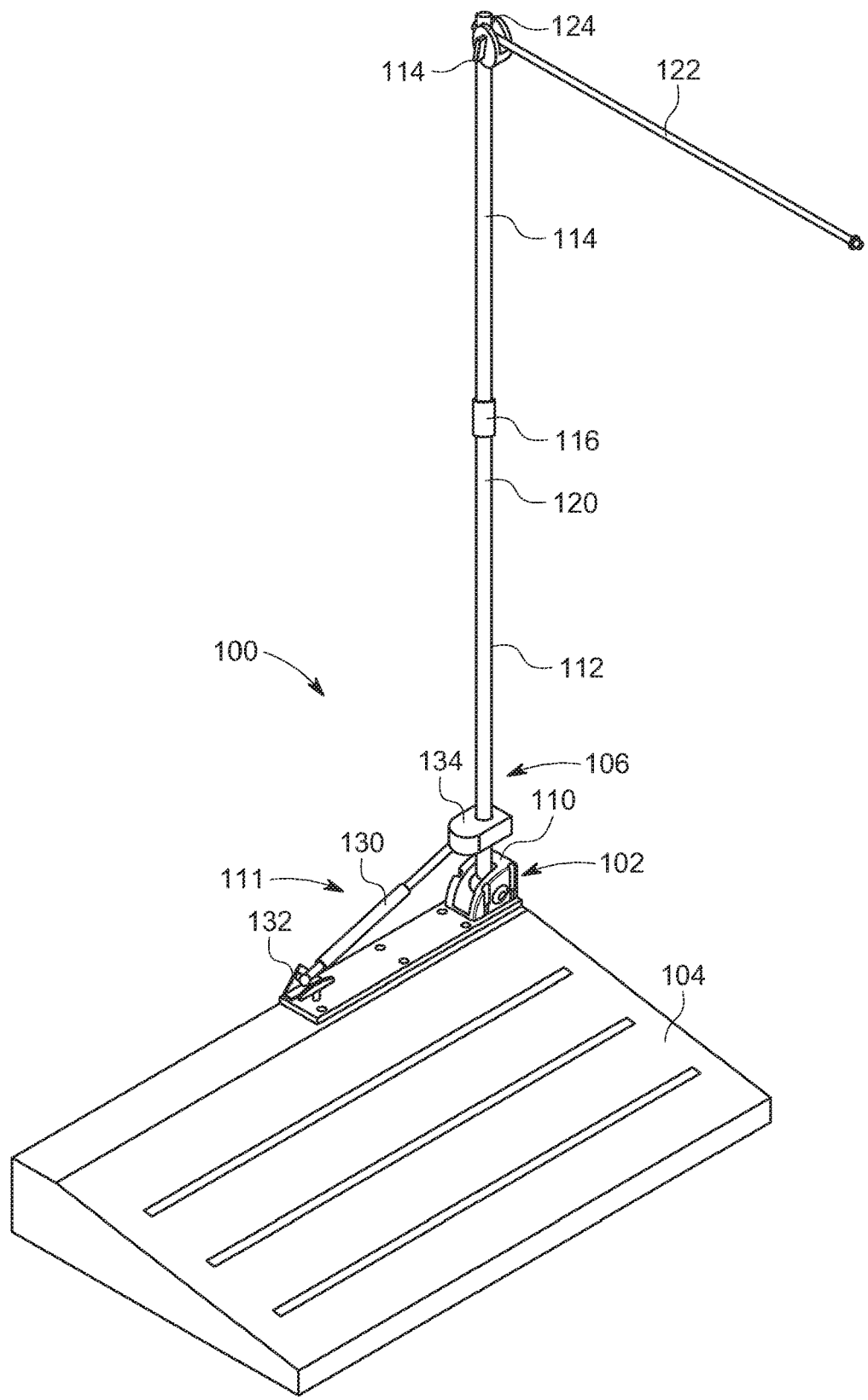
FIG. 1 is perspective view of the microphone stand in a fully extended position.
Figure 2:
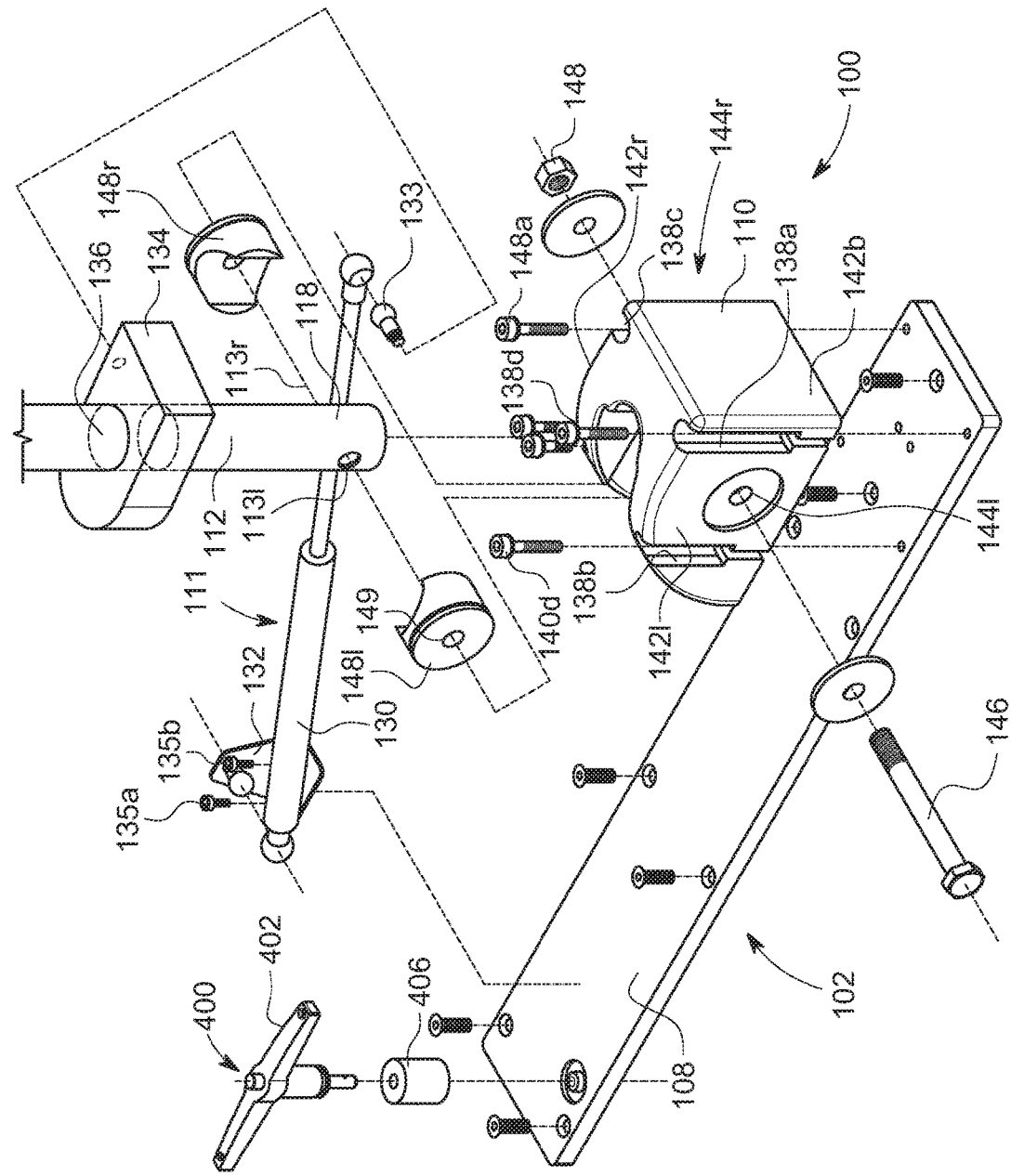
FIG. 2 is an exploded view of the microphone stand.
Figure 3:
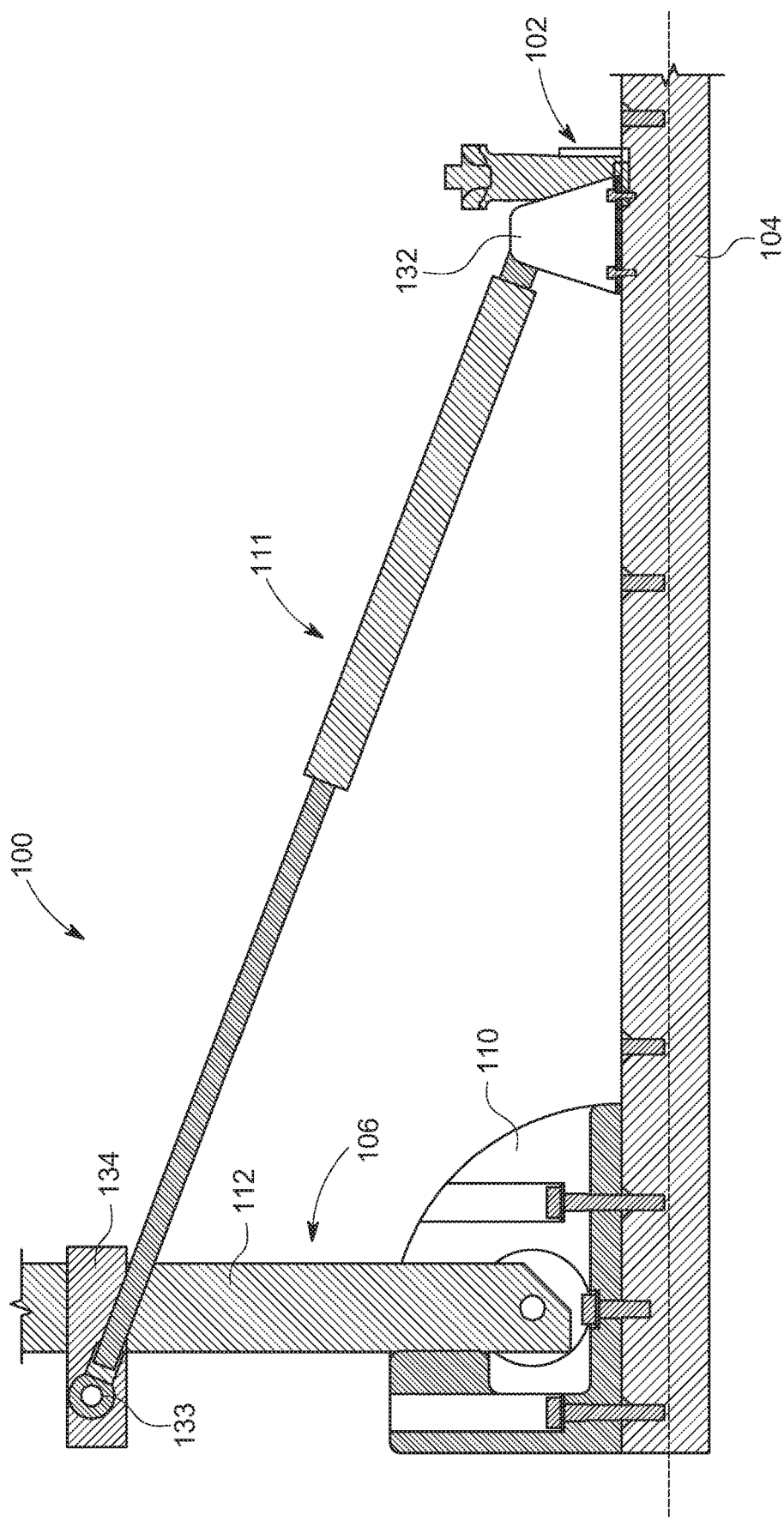
FIG. 3 is a side cutaway view of the microphone stand shown in FIGS. 1-2.

Referring to FIGS. 1-3, there is shown a microphone stand 100 in a fully extended position. Microphone stand 100 includes a base section 102 mounted on a pedal board 104 and is coupled with a microphone holding section 106. Pedal board 104 is generally available from third parties and comes in a variety of designs. Pedal boards may be connected (integrally or using attachment devices) to pedals or buttons to enable a musician (using their foot) to control and manage addition sounds during a live performance.

Base section 102 includes a base plate 108 coupled with a riser block 110 and an expanding shaft section 111. Base section 102 can be adapted to fit a variety of existing pedal boards by way of a shim or riser, either of existing design, or custom made to compensate for a rate of rise of the pedal board 104 to a horizontally flat surface for base section 102 to be mounted. Base plate 108 is coupled to pedal board 104 using screws 109a-109n. Microphone holding section 106 includes a bottom tube 112 that is connected at one end 118 to riser block 110.

Referring to FIG. 1, connected to tube 112 at its other end 120 is top tube 114. Top tube 114 slides into and out of bottom tube 112 and is prevented from sliding with coupling 116. A boom 122 for holding a microphone (not shown) is connected to a far end 114f or top tube 114 with rotating extension device 124.

Referring to FIGS. 1-3, expander shaft section 111 includes an expandable shaft 130, a bracket 132 and a mounting block 134. Expandable shaft 130 is coupled at one end to bracket 132 and coupled at its other end to a screw 133 on mounting block 134. Bracket 132 is coupled to base plate 108 using screws 135a-b. Mounting block 134 forms an aperture 136 for encircling bottom tube 112 and is positioned on bottom tube 112 adjacent microphone holding section 110 and riser block 110. Mounting block 134 is clamped in position onto bottom tube 112 using screw 133.

Referring to FIG. 1-3, riser block 110 is mounted on base plate through groves 138 *a-d* of block 110 of base plate 108 using screws 140a-d. Riser block 110 forms walls (left wall 142l, right wall 142r and back wall 142b) on three sides of riser block 110. Opposing left wall 142l and right wall 142r each form opposing apertures 144l and 144r.

Referring to FIG. 2-3, bottom tube 112 has apertures 113l and 113r at opposing surfaces at its lower end. Tube clamps 148l and 148r each have an aperture 149 extending therethrough and are positioned respectively adjacent the apertures 113l and 113r. Tube clamps 148l and 148r are each constructed with two parts, specifically a standard washer, and a saddle washer. The standard washer is only used as a spacer when the microphone stand shaft is smaller in diameter than the space provided to prevent wobble.

A screw 146 is inserted into washer 147, aperture 144l, through aperture 144, 149, 113l, 113r, 149 and 144r to hold tube 112. Screw 146 is locked in place using a washer and nut 148. Once tube is held using screw 146, tube 112 can rotate in riser block 110 about a horizontal axis extending through screw 146 from a vertical position (FIGS. 1-3) to a horizontal position (FIG. 4).

Expandable shaft 130 is maintained under pressure (air or hydraulic). This pressure holds the microphone holding section 106 secure and in the vertical orientation. Shaft 130 is prevented from contracting as the pressure is always engaged to push the stand shaft into the vertical orientation. Physical pressure applied against the microphone holding section 106 may be required to force the section 106 sideways and downward into the horizontal orientation, at which time the handle 402 is twisted 90 degrees to lock the shaft into the horizontal orientation by trapping it under the handle. Expandable shaft 130 expands from a compressed position to an expanded position to assist in holding bottom tube (as well as the microphone holding section) in place when bottom tube 112 (and microphone hold section 106) is rotated about screw 133 from a horizontal orientation (FIG. 4) to a vertical orientation (See FIG. 3). Expandable shaft 130 contracts to a compressed position when bottom tube 112 (and microphone hold section 106) is rotated about screw 133 from a vertical orientation (FIG. 3) to a horizontal orientation (See FIG. 4).

Figure 4:
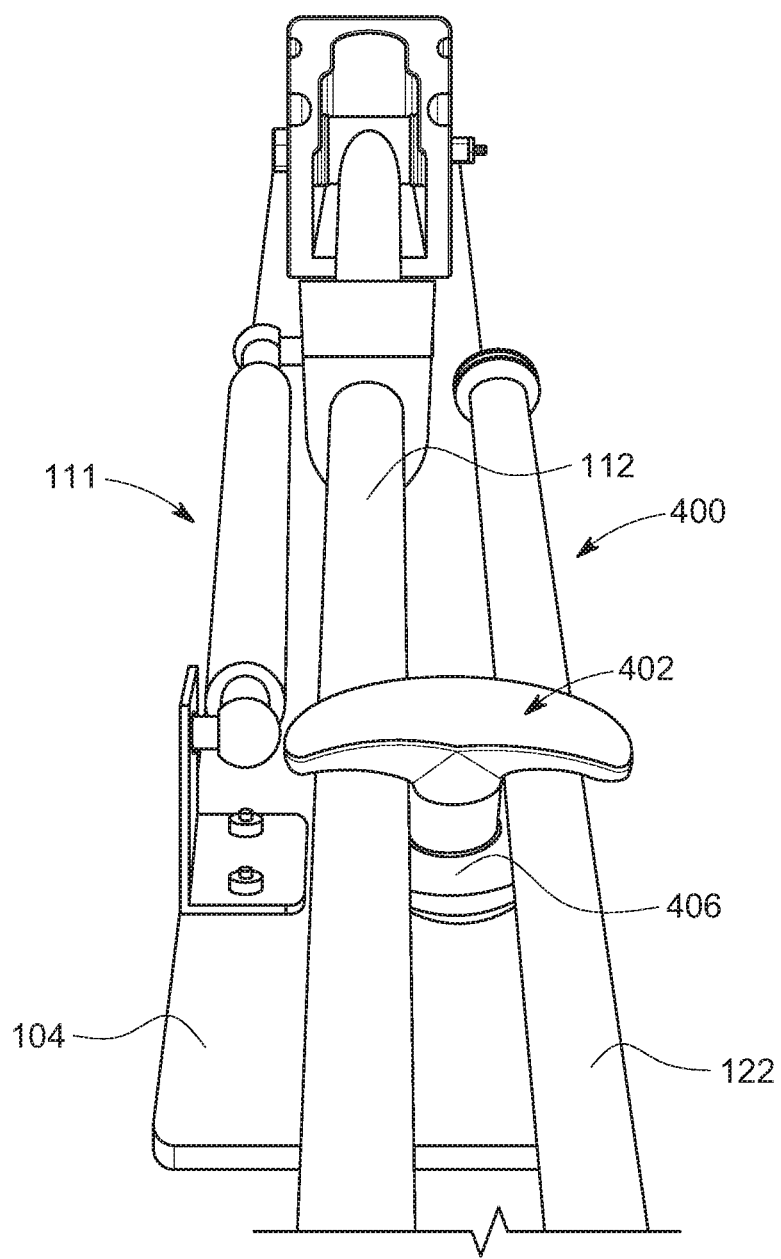
FIG. 4 is a top perspective view of the microphone stand in a collapsed position.

Referring to FIG. 4, microphone stand 400 (stand 100 in FIGS. 1-2) is shown in a storage position. Referring to FIGS. 2 & 4, stand 400 includes a tube locking mechanism 401 (FIG. 2) having a handle 402 is connected to plate 108 via short tube 406. Handle 402 can be rotated about a vertical axis extending through handle 402 to an orientation extending parallel to base plate 108 (FIG. 3) to an orientation extending perpendicular to base plate 108 so that when bottom tube 112 is rotated to a horizontal position, handle 402 locks bottom tube 112 and boom 122 to plate 108. Handle 402 can also be rotated from an orientation parallel to base plate 108 (FIG. 4) to an orientation perpendicular to base plate 108 (FIG. 3) so that tube 112 can be rotated to a vertical position.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion but should be defined by the appended claims.

What is claimed is:

1. An apparatus for holding a microphone comprising:
    a microphone holding section including a tube;
    a base section having a base plate connected to a riser block to engage with the tube of the microphone holding section to enable rotation the microphone holding section from a horizontal orientation to a vertical orientation; and
    an expander shaft section including an expander shaft coupled at one end with a mounting block attached to the tube and at another end with the base plate, the expander shaft to expand from a compressed shaft position to an expanded shaft position when the microphone holding section rotates from the horizontal orientation to the vertical orientation to assist in holding the microphone holding section in the vertical orientation.

2. The apparatus as recited in claim 1, wherein the riser block engages with the tube of the microphone holding section using a screw that is inserted into apertures formed on opposing sides of the riser block and apertures formed adjacent one end of the tube.

3. The apparatus as recited in claim 1, wherein the tube includes a bottom tube that engages with the riser block and a top tube that engages with a boom for holding a microphone.

4. The apparatus as recited in claim 3, wherein the at least one of the top tube and bottom tube retracts into at least one of the top tube and the bottom tube.

5. The apparatus as recited in claim 1, wherein the base section mounts to a pedalboard.

6. The apparatus as recited in claim 1 wherein the mounting block is clamped in a fixed position on the tube adjacent the riser block and is operative to remain in the fixed position when the expander shaft is in the compressed shaft position and is in the expanded shaft position.

7. The apparatus as recited in claim 1, further comprising a tube locking mechanism connected to the base plate.

8. The apparatus as recited in claim 7, wherein the tube locking mechanism includes a having a rotatable handle connected to the base plate via short tube to engage and prevent rotation of the tube when in the horizontal position.

9. A method for holding a microphone comprising:
    providing a microphone holding section including a tube;
    connecting a base section having a base plate to a riser block;
    engaging the riser block with the tube of the microphone holding section using a screw extending through apertures in the tube and the riser block;
    pivoting the microphone holding section about the screw from a horizontal orientation to a vertical orientation;
    attaching a mounting block to the tube;
    coupling one end of an expander shaft to the mounting block and another end of the expander shaft to the base plate; and
    expanding the expander shaft from a compressed shaft position with the mounting block disposed on the tube adjacent the riser block to an expanded shaft position with the mounting block disposed on the tube adjacent the riser block while changing an orientation of the tube from a horizontal orientation to a vertical orientation to assist in holding the microphone holding section in the vertical orientation.

10. The method as recited in claim 9, wherein the tube rotates about the screw changing from the orientation of the tube from the horizontal orientation to the vertical orientation.

11. The method as recited in claim 9, wherein the tube includes a bottom tube and top tube, the method further comprising engaging the bottom tube with the riser block and engaging the top tube with a boom for holding a microphone.

12. The method as recited in claim 11, further comprising retracting at least one of the top tube and bottom tube into at least one of the top tube and the bottom tube.

13. The method as recited in claim 9, further comprising mounting the base section to a pedalboard.

14. The method as recited in claim 9, further comprising clamping the mounting block to the tube adjacent the riser block while the expander shaft is in the compressed shaft position and expands to the expanded shaft position.

15. The method as recited in claim 9, further comprising connecting a tube locking mechanism to the base plate.

16. The method as recited in claim 15, wherein the tube locking mechanism includes rotatable handle, and wherein the method further comprises connecting a rotatable handle to the base plate via short tube to engage and prevent rotation of the tube in the horizontal position.

17. An apparatus for holding a microphone comprising:
   a microphone holding section;
   a base section connected to a riser block, the riser block comprising a means for engaging with the microphone holding section and a means for enabling rotation of the microphone holding section about a horizontal axis extending through the riser block when the base section rests on a floor; and
   an expander shaft section coupled at one end with a mounting block attached to the microphone holding section and at another end with the base section, the expander shaft section including a means for expanding from a compressed position to an expanded position as the microphone holding section rotates about the axis; and
   wherein the apparatus further comprising a tube locking mechanism connected to the base section; and
   wherein the tube locking mechanism includes a rotatable handle coupled with the base section to engage with the expander shaft section to prevent rotation of the microphone holding section.

* * * * *